March 14, 1961  F. G. BITNER ET AL  2,974,593
SEAL
Filed Nov. 7, 1952
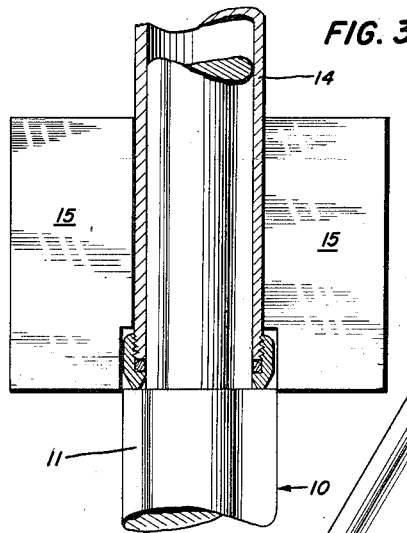
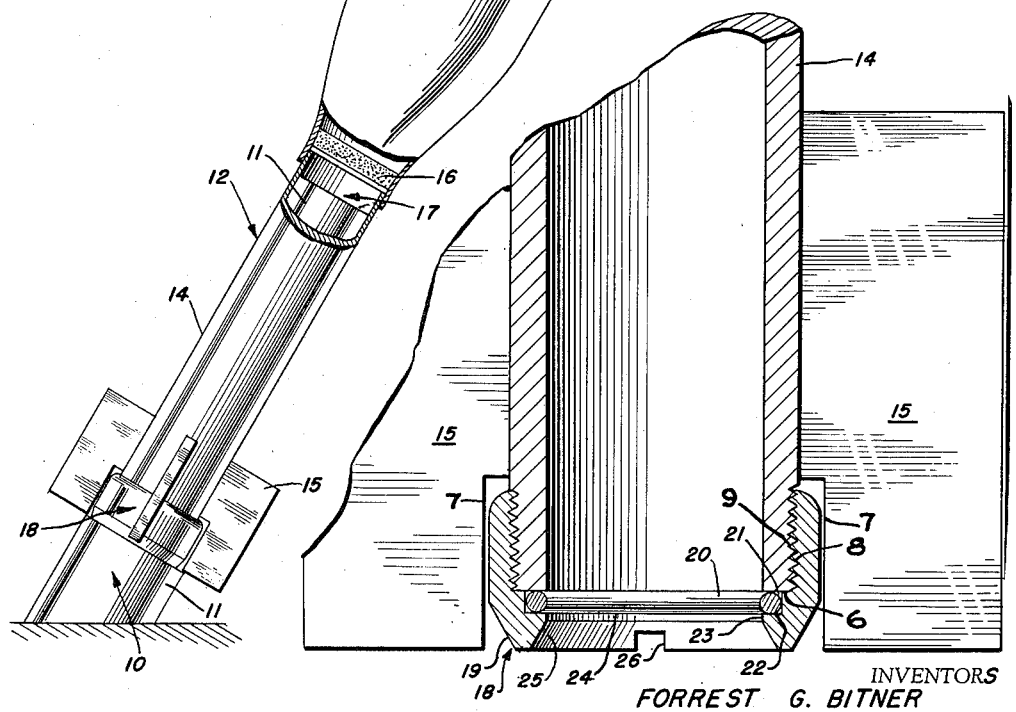
INVENTORS
FORREST G. BITNER
HARRY SILK
BY
ATTORNEYS

United States Patent Office 2,974,593
Patented Mar. 14, 1961

2,974,593

SEAL

Forrest G. Bitner and Harry Silk, Washington, D.C., assignors to the United States of America as represented by the Secretary of the Navy Filed Nov. 7, 1952, Ser. No. 319,438

1 Claim. (Cl. 102—49)

(Granted under Title 35, U.S. Code (1952), sec. 266)

The invention described herein may be manufactured and used by or for the Government of the United States of America for governmental purposes without the payment of any royalties thereon or therefor.

This invention relates to seals or packings for rods or shafts wherein it is desired to provide a fluid tight packing for an axially reciprocable shaft and is particularly adapted to withstand high pressure during use.

In the present description the invention is shown adapted to an item of naval ordnance such as the tail tube of a rocket projectile wherein it is important to maintain a tight but slidable seal between the tube and the spigot upon which it is mounted. This type of projectile is fired or launched from the spigot by the expansion of gases and resultant pressure produced by the ignition of explosive materials within a chamber bounded by the end of the spigot, the walls of the tail tube, and the base of the projectile. Therefore, it is apparent that the effective operation of spigot fired projectiles is dependent upon maintaining a seal between the spigot and the tail tube of the projectile.

Heretofore it has been proposed to employ a seal for the afore-mentioned purpose in the form of an O-ring, composed of deformable material, seated within an annular groove formed in the inner surface of a tail tube and adapted to contact the surface of the spigot. However, because the tail tube is normally fabricated from commercial tubing whose internal dimensions are not held to close tolerances, an unduly large spacing frequently resulted between the afore-mentioned surfaces, causing the O-ring to squeeze out between the projectile tail tube and the spigot upon movement over the spigot, thereby destroying the seal and affecting the range of the projectile.

To correct this past difficulty the present invention provides a simple, inexpensive adapter to be mounted on the tail tube of the projectile. The adapter is provided with an internal annular groove for accommodating an O-ring and has a trailing portion or inwardly disposed rib whose internal diameter may be machined to close tolerances with respect to the external diameter of the spigot to effectively prevent the extrusion of the O-ring and thereby provide an effective seal.

Accordingly, it is an object of the present invention to provide a simple, inexpensive fluid pressure seal.

Another object is to provide a seal for a rod or shaft.

Still another object is to provide a sealing mechanism which is adapted to be secured on one of two concentrically mounted and relatively slidable elements to effect a seal therebetween.

Other objects and many of the attendant advantages of this invention will be readily appreciated as the same becomes better understood by reference to the following detailed description when considered in connection with the accompanying drawings wherein:

Fig. 1 is a side elevation partially broken away of a projectile embodying the present invention, shown mounted on a launching spigot;

Fig. 2 is an enlarged detailed sectional view of the end portion of a tail tube of the projectile; and Fig. 3 is a longitudinal sectional view of the end portion of a tail tube mounted on a launching spigot.

Referring to the drawing, wherein like reference numerals designate the same parts throughout the several views, there is disclosed in Fig. 1 a projectile launcher 10, commonly referred to as a "hedge hog" launcher, which is shown comprised of a spigot 11, but which may include a plurality thereof, for supporting and guiding the initial flight of a projectile 12 embodying the present invention. The projectile 12 is comprised of a warhead 13 having secured thereto, in any well-known manner, a tail tube 14 which is adapted to be mounted concentrically with the spigot 11. The tail tube 14, usually formed of commercial tubing, cooperates with the spigot 11 in initially supporting the projectile 12 in a ready position, and thereafter in guiding the projectile in a predetermined angle of flight stabilized by a plurality of fins 15 secured on the after portion of the tail tube.

The projectile or depth charge 12 is projected from the spigot 11 by the explosion of a propellent charge 16 located within a chamber 17 bounded by the side wall of the tail tube 14, the end of the spigot 11, and the base of the warhead 13. In order that the propellent force provided by the expansion of the explosive gases may be employed efficiently to project all depth charges a predetermined maximum distance it is necessary that the chamber 17 be made substantially fluid tight to prevent the premature escape of the gases to the atmosphere. In order to accomplish this end, that is, to prevent the escape of the explosive gases through the spacing between the sliding contact surfaces of the spigot 11 and the tail tube 14, there is provided a seal assembly 18 adapted to be mounted on the after end of the tail tube 14.

The seal assembly 18 is comprised of an adapter ring 19 which is preferably provided with internal threads 8 to be screw fitted onto the threaded portion 9 of the tail tube 14, and an O-ring 20 composed of deformable material, such as synthetic rubber, for contacting and conforming to the surface of the spigot to effect a closure of the spacing which normally exists between the relatively slidable surfaces of the tail tube and the spigot, and thereby prevent the escape of the explosion gases. The O-ring is normally held in position within an annular groove 21 formed by a first annular shoulder 6 which abuts against a portion of the end of the tail tube 14 and a second continuous annular shoulder 22 axially spaced from shoulder 6 within adapter ring 19 as shown in Fig. 2. An inwardly extending edge 23 of the shoulder 22 defines an aperture 24 whose size and configuration is determined by the physical characteristics of the spigot.

In the preferred embodiment as shown, the cross section of the spigot 11 is circular, hence the configuration of the aperture as defined by the edge or rib 23 is complementary thereto, but it will be understood that the spigot may assume any cross-sectional configuration and that the configuration of the aperture of the seal assembly associated therewith will be complementary thereto.

An important function of the rib 23 is to prevent the extrusion of the O-ring 20, therefore, it is machined with precision so that the dimension of the aperture defined thereby is held to close tolerances whereby a minimum spacing will occur between the adjacent surfaces of the rib and the spigot 11.

The mounting of the adapter ring 19 on the spigot 11 is facilitated by a chamfer 25 which extends from the rib 23 to the end of the ring 19. The ring cross-sectional area gradually increases to a maximum at the end of the ring 19 so that the ring may readily be positioned over the spigot 11.

In use, the depth charge 12 may be furnished with the seal assembly 18 attached thereto, or if preferred the assembly may be attached, just prior to use, by threading it thereon in the space provided by the slotted portions 7 of each of the fins 15 and securing the assembly by the use of a spanner wrench which may be readily inserted in grooves 26 provided in the adapter ring for that purpose. The seal assembly 18 may be provided having ribs 23 describing apertures 24 of different cross section dimensions to compensate for slight differences in the dimensions of the spigots which may be occasioned by wear or other factors. If desired, the O-ring 20 may be treated with a lubricating substance, such as grease, in order to reduce friction between the O-ring and the spigot 11 during the projection or "break-away" of the depth charge 12. The projectile or depth charge 12 is then mounted on the spigot 11 and projected therefrom by the ignition of the propellent charge 16 from a remote firing station. The resultant explosion causes gases to be produced which exert a pressure within the chamber 17 to raise the depth charge 12 off the spigot 11 and project it toward a target. The full force of the gas pressure is effective to project the depth charge 12 due to the seal assembly 18, which prevents the gases from escaping to the atmosphere until the O-ring 20 has moved past the end of the spigot 11.

Obviously many modifications and variations of the present invention are possible in the light of the above teachings. It is therefore to be understood that within the scope of the appended claim the invention may be practiced otherwise than as specifically described.

What is claimed is:

In a charge projectile having a longitudinal cylindrical tail tube adapted to be seated in telescopic relationship upon a cylindrically shaped spigot and fired therefrom, the tail tube having an externally threaded portion at the after end thereof and a plurality of fins circumferentially spaced around and secured to the after end portion of the tube, each of the fins being longitudinally slotted along their inner sides adjacent the threaded portion of the tail tube to permit access to the threaded portion, a quick connectable seal assembly appendage for providing a closure of the space between the adjacent axial surfaces of the spigot and the tail tube comprising, a stepped internally threaded ring member adapted to be threaded onto the threaded portion of the tail tube within the space provided by the slotted portions of the fins, said ring member having a first internal continuous annular shoulder adapted to abut against a first portion of the end of the tail tube when the ring member is in threaded position thereon, a second internal continuous annular shoulder formed in the ring member, said second annular shoulder being longitudinally spaced from said first shoulder to form an annular groove between said second shoulder and a second portion of the end of the tail tube when said ring member is in threaded position, an O-ring formed of deformable material and seated firmly against the base of the groove when the ring is in threaded position and having an internal diameter less than the diameter of the spigot, the inner edge surface of the second shoulder being machined to close tolerance and describing an aperture corresponding to the cross-sectional dimension of the spigot, and said ring member being chamfered radially outwardly from the after extremity of the inner edge surface of the second shoulder to facilitate positioning of the tail tube of the projectile over the spigot during assembly.

References Cited in the file of this patent

UNITED STATES PATENTS

| | | |
|---|---|---|
| 1,347,125 | Schneider | July 20, 1920 |
| 1,861,522 | Brandt | June 7, 1932 |